Oct. 5, 1937.  W. M. RYAN ET AL  2,094,754
CONVEYING AND SEALING CONTAINER UNDER AIR-FREE CONDITIONS
Filed Aug. 18, 1934  8 Sheets—Sheet 1
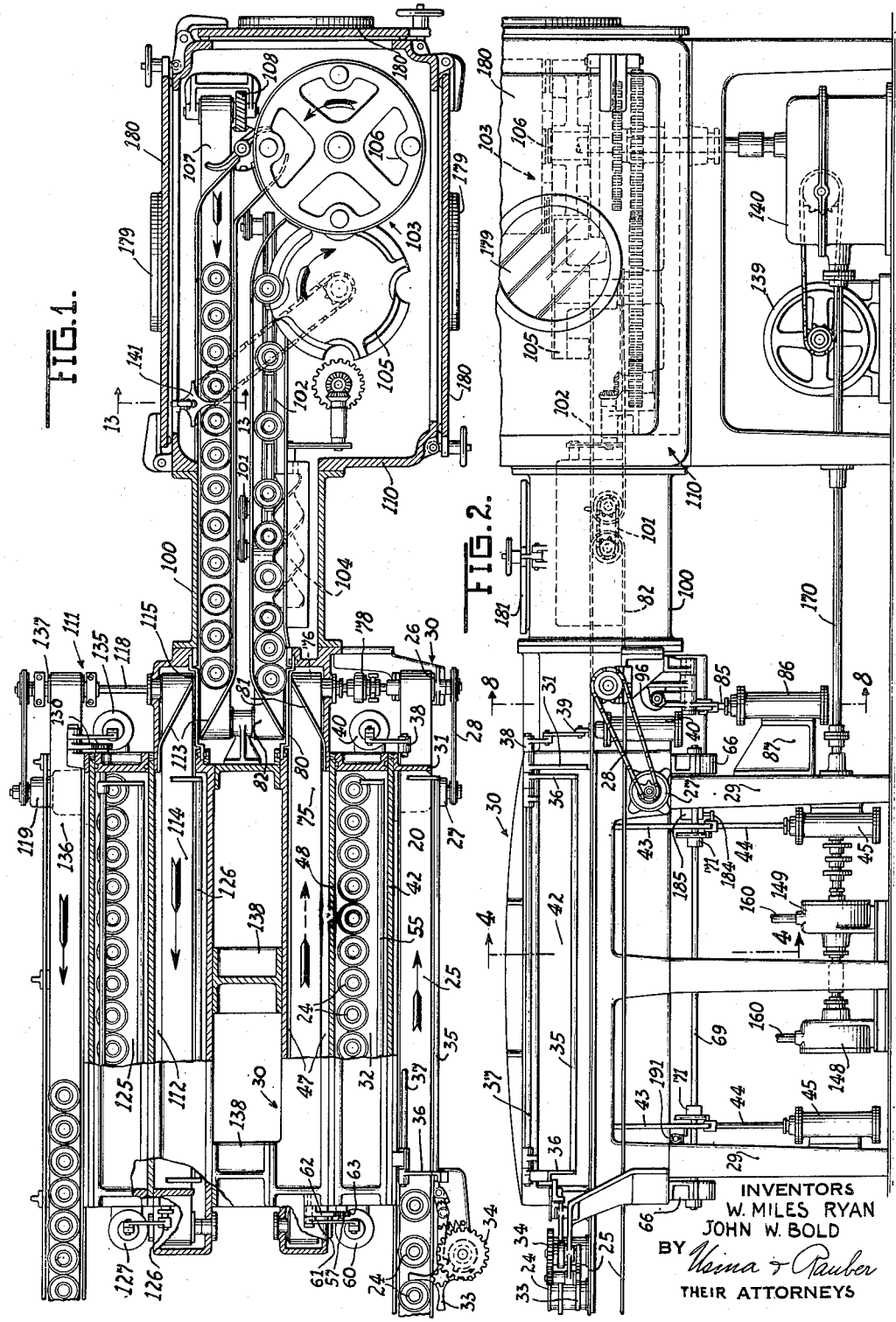
INVENTORS
W. MILES RYAN
JOHN W. BOLD
BY *Usina & Rauber*
THEIR ATTORNEYS Oct. 5, 1937.  W. M. RYAN ET AL  2,094,754
CONVEYING AND SEALING CONTAINER UNDER AIR-FREE CONDITIONS
Filed Aug. 18, 1934  8 Sheets-Sheet 2
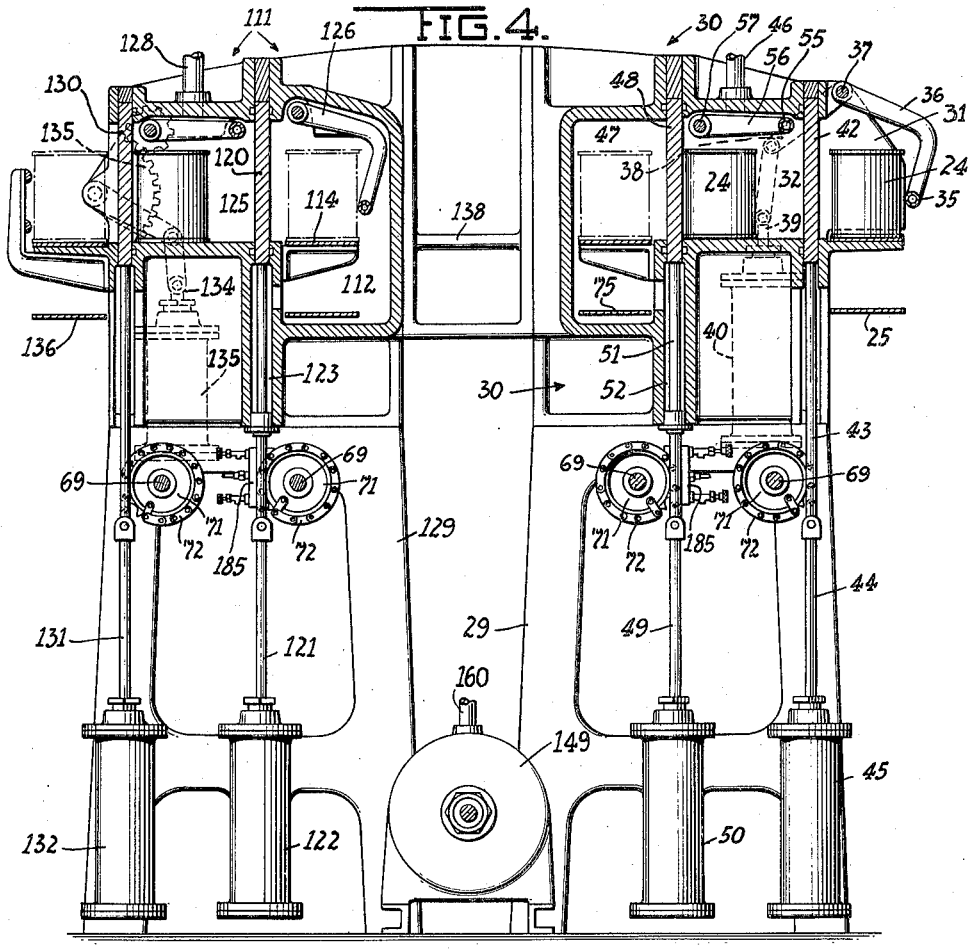
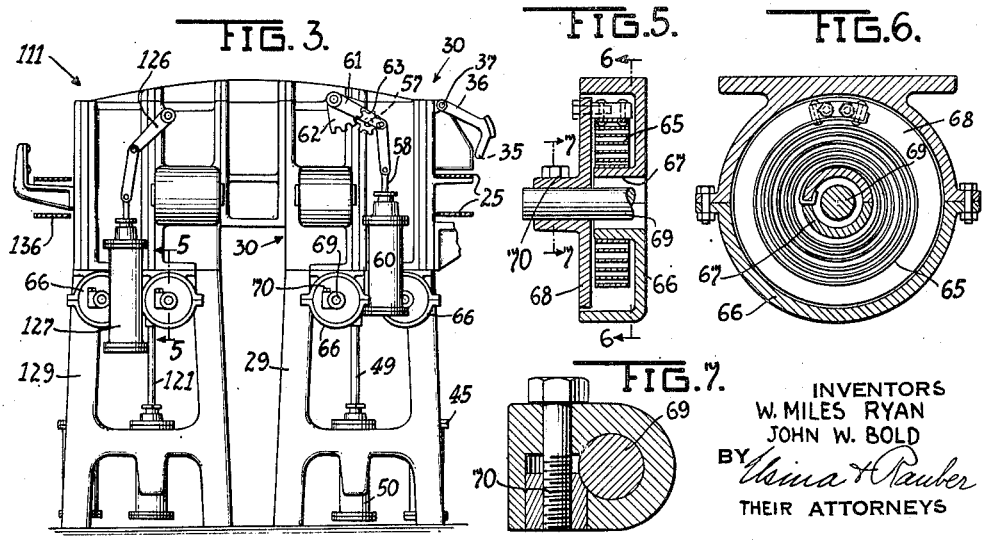
INVENTORS
W. MILES RYAN
JOHN W. BOLD
BY
THEIR ATTORNEYS

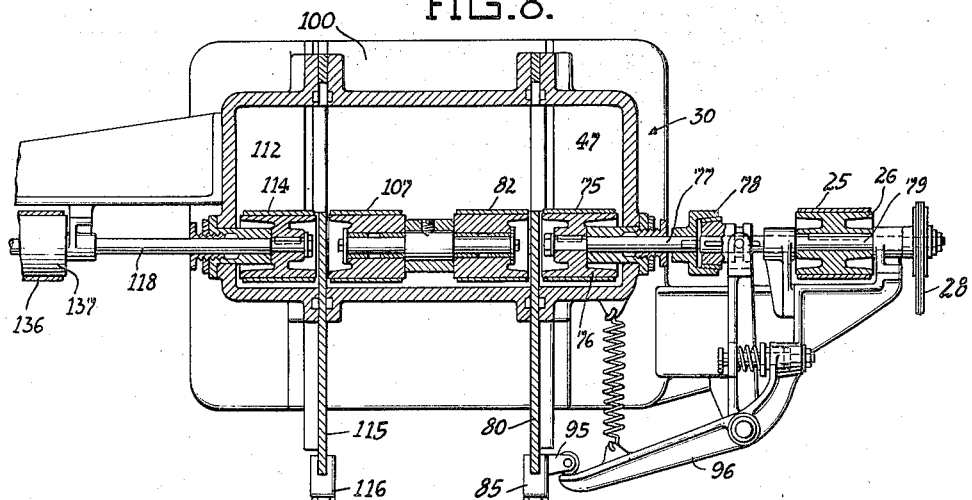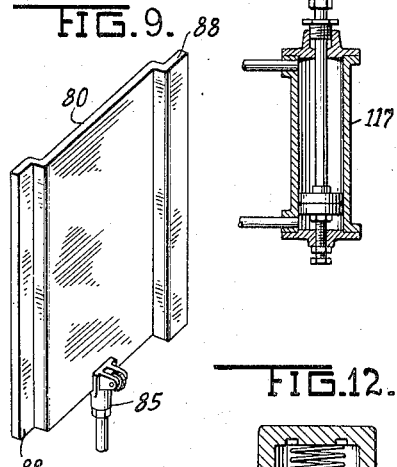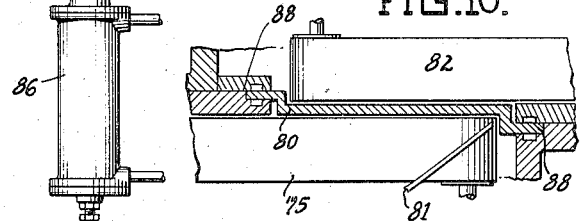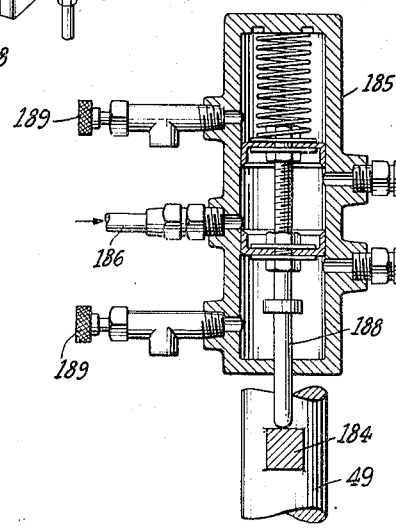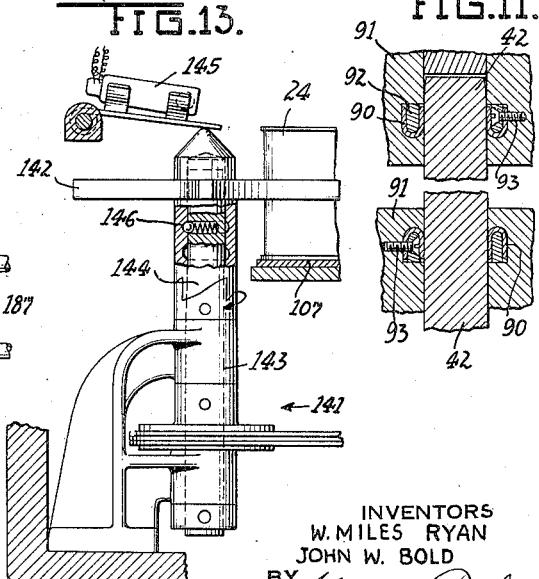

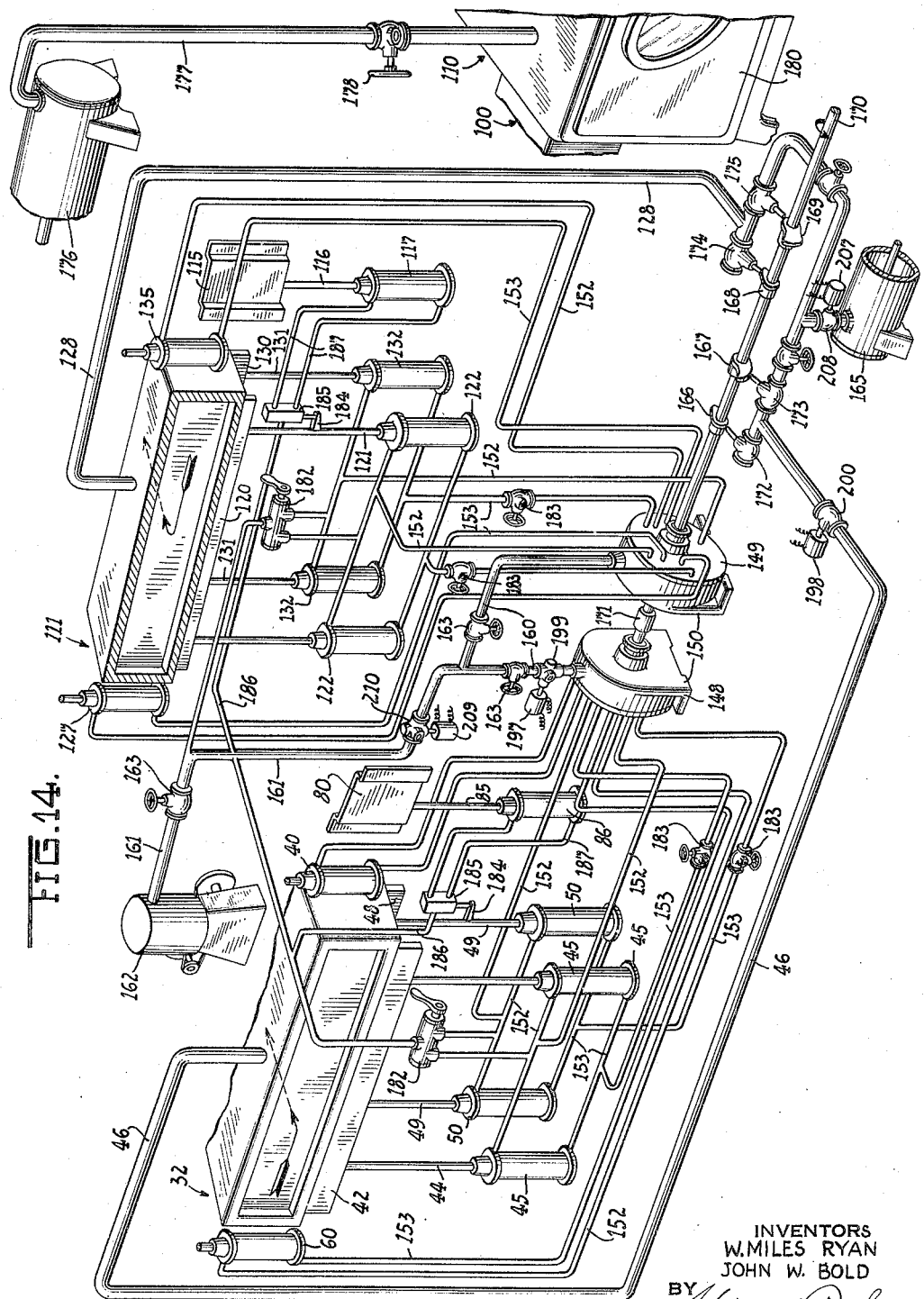

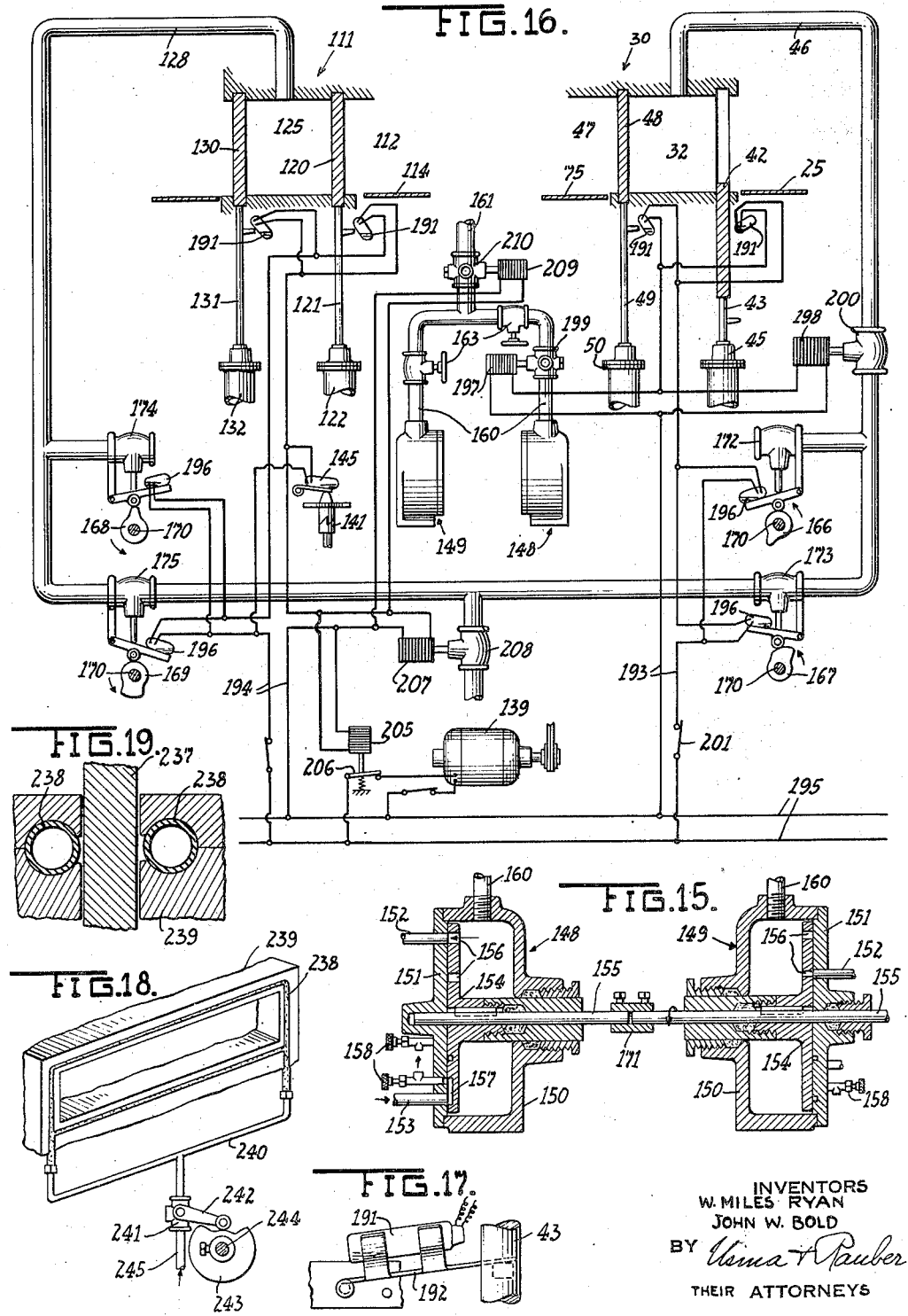

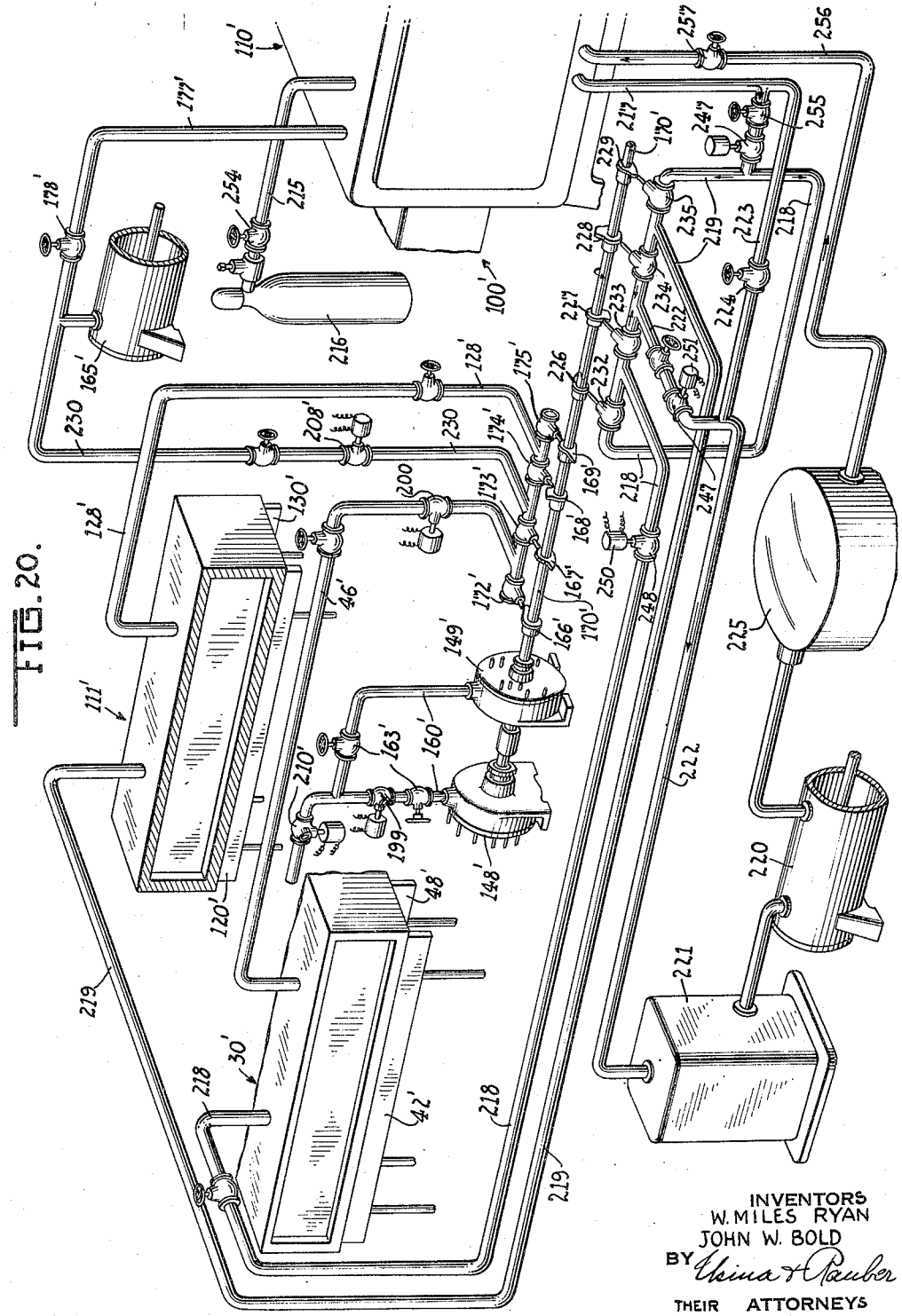

Oct. 5, 1937.  W. M. RYAN ET AL  2,094,754
CONVEYING AND SEALING CONTAINER UNDER AIR-FREE CONDITIONS
Filed Aug. 18, 1934  8 Sheets-Sheet 7

INVENTORS
W. MILES RYAN
JOHN W. BOLD
BY
THEIR ATTORNEYS

Oct. 5, 1937. W. M. RYAN ET AL 2,094,754
CONVEYING AND SEALING CONTAINER UNDER AIR-FREE CONDITIONS
Filed Aug. 18, 1934 8 Sheets-Sheet 8
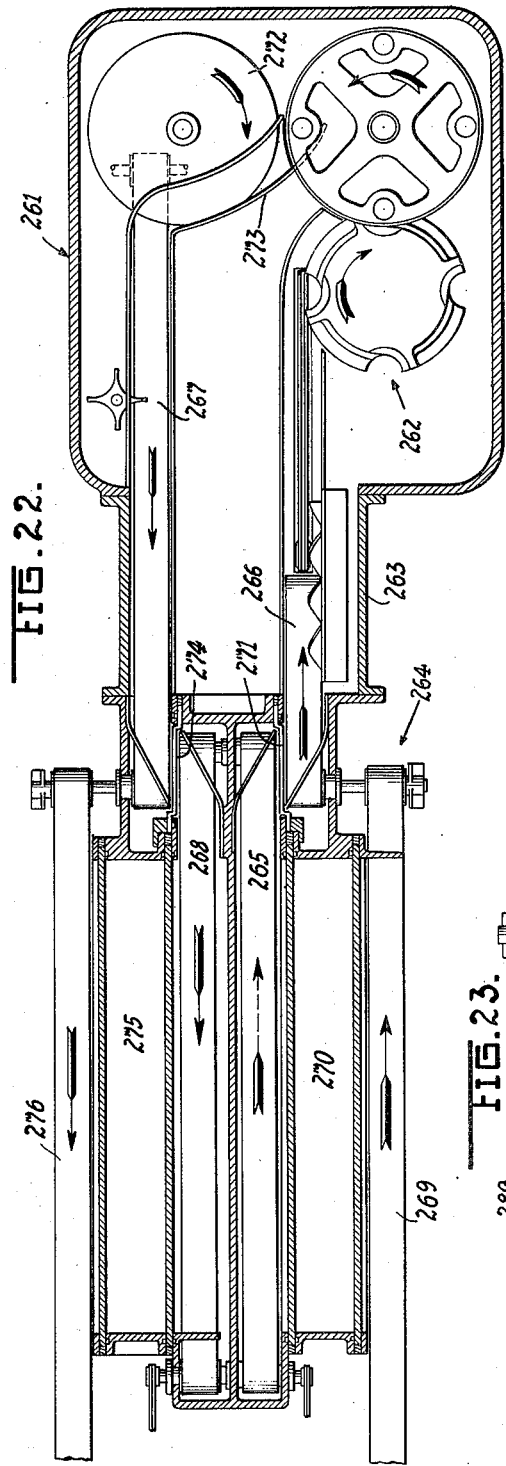
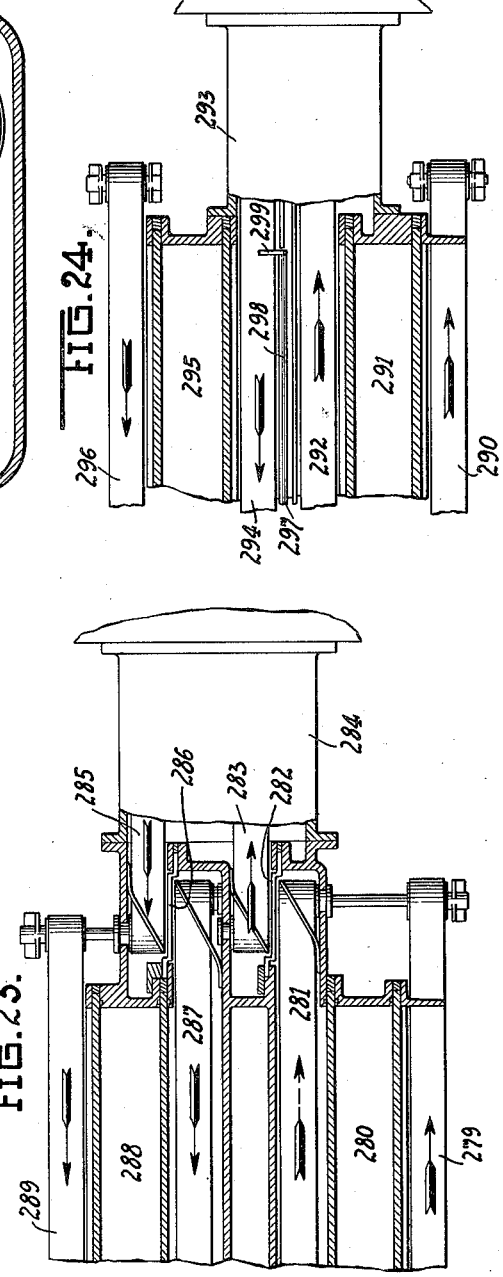
INVENTORS
W. MILES RYAN
JOHN W. BOLD.
BY
THEIR ATTORNEYS Patented Oct. 5, 1937

2,094,754

UNITED STATES PATENT OFFICE 2,094,754

CONVEYING AND SEALING CONTAINER UNDER AIR-FREE CONDITIONS

William Miles Ryan and John W. Bold, Brooklyn, N. Y., assignors to Ryan Coffee Corporation, Brooklyn, N. Y., a corporation of New York Application August 18, 1934, Serial No. 740,372

74 Claims. (Cl. 226—68)

This invention relates to mechanisms for sealing and packing coffee, fruit, meat and the like in containers under a vacuum or gas in which the contents of the containers are vacuumized in a sealing room.

In this type of mechanism the containers are fed through a suitable valve mechanism under changing conditions of gaseous pressure into a sealing room in which they are transferred to a sealing machine. After the containers have been hermetically sealed they are led out of the room through a discharge valve, without, however, influencing the gaseous pressure within the sealing room. This type of sealing machine has been found the most practical and in accordance with our experience very satisfactory for packing and canning product.

We have found however that considerable improvements are still possible in the development of such machines and it is therefore an object of our invention to provide new features of importance contributing to an increase in speed of operation and consequent output. Further objects are to provide a new transfer mechanism operatable under a vacuum or a selected gas, which serves the purpose to transfer containers toward and from the sealing room while being controlled in their movements by novel regulating and safety devices.

These and other objects which will appear evident in this specification and particularly in the subjoined claims, are attained by means of the mechanisms illustrated in the accompanying drawings of which a full and clear description follows forthwith:

In these drawings Fig. 1 illustrates a plan view of a conveying and sealing mechanism partially in section.

Fig. 2 is a side view of the mechanism.

Fig. 3 is an end view of the container transfer unit of this mechanism.

Fig. 4 is an enlarged sectional view of Fig. 3 on line 4—4, Fig. 2.

Figs. 5 and 6 are respective sectional side and plan views of a counter balancing device.

Fig. 7 is a sectional plan view of an adjustable lock for the disc of the balancing device, on line 7—7, Fig. 5.

Fig. 8 is a sectional end view of part of the transfer unit on line 8—8, Fig. 2.

Fig. 9 is a perspective view of one type of valve gate.

Fig. 10 shows a sectional top view of this gate and its conformity relative to the location of conveyor belts.

Fig. 11 illustrates a sectional side view of a valve gate and seals for same.

Fig. 12 is a sectional side view of a control valve.

Fig. 13 is a side view of an electrical safety control to stop the operating mechanisms.

Fig. 14 illustrates a diagrammatic arrangement of piston-operated mechanism with actuating and controlling devices interconnected.

Fig. 15 is a sectional side view of two power distributors operating the various pistons in time sequence.

Fig. 16 is a diagrammatic arrangement of electrical safety controls connected with various mechanisms of the machine.

Fig. 17 is a side view of a mercury switch mounting.

Fig. 18 shows a perspective view of a time operated gate seal.

Fig. 19 is a sectional end view of part of this seal.

Fig. 20 illustrates a diagrammatic view of mechanisms required for the application of selected gas to the containers.

Fig. 22 is a plan view of a conveying and sealing machine similar to Fig. 1, but showing a modified arrangement of conveying belts.

Fig. 23 is a partial plan view similar to Fig. 21, showing, however, a disposal of the conveyor-belt different from that of Figs. 1 and 21.

Fig. 24 shows a partial plan view of still another modified form of conveyor-belt displacements.

Throughout the specification and drawings, similar reference characters denote corresponding parts.

Figure 21:
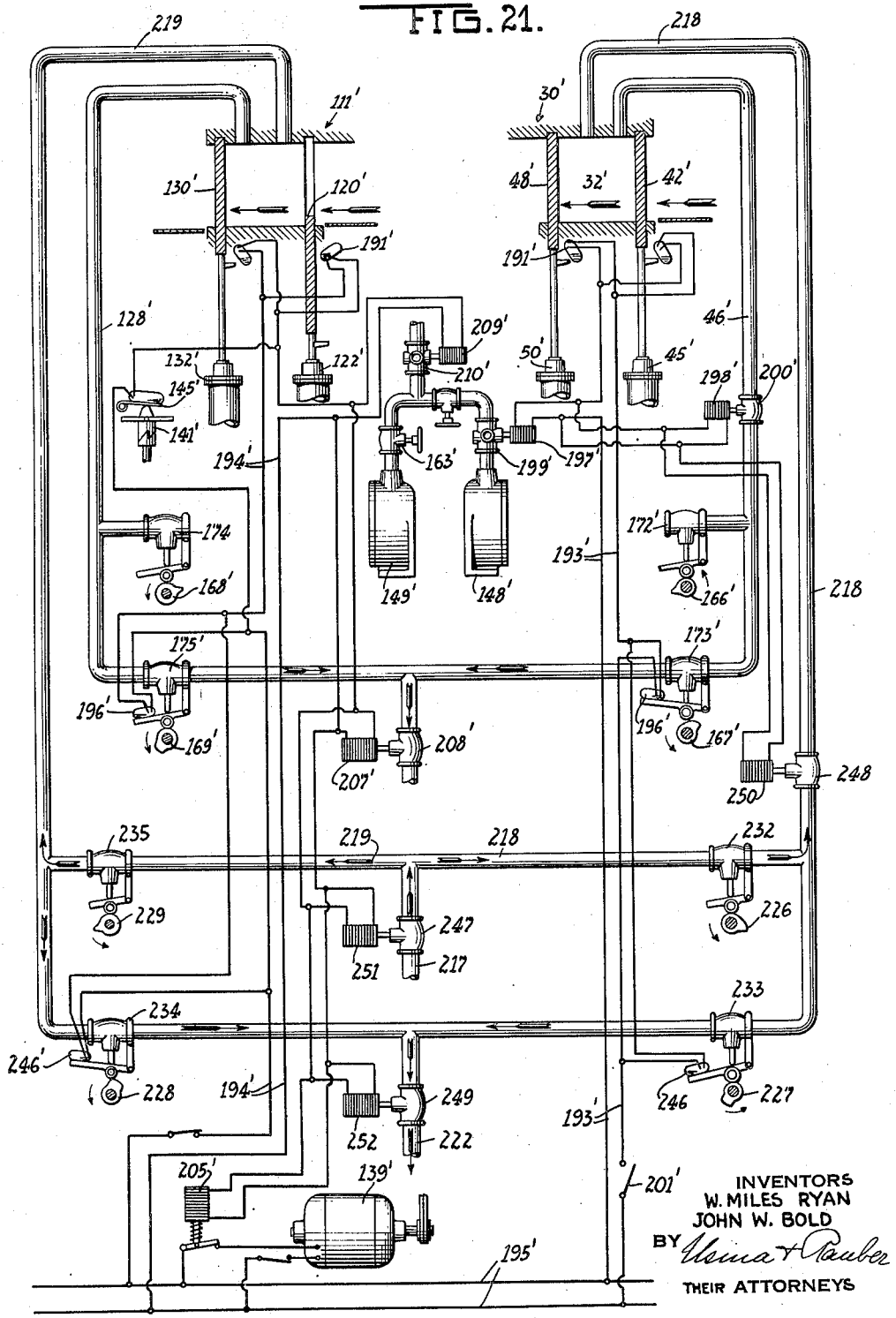
Fig. 21 shows a diagrammatic view of an electrically operated control of the mechanisms of Fig. 19.

In the present invention the cans are conveyed by a delivery belt past a turnstile towards the intake side of the apparatus. The turnstile permits a definite number of cans to pass to a position to enter the sealing apparatus and stops those which follow, until the group of cans, which has previously passed the turnstile, is delivered or pushed into a prevacuum chamber of the apparatus. This chamber is provided with an inner and outer gate.

After the cans have been pushed into this chamber, its outer gate is closed. Thereafter the air is gradually withdrawn from the chamber and the product in the cans is thereby vacuumized.

The inner gate of the prevacuum chamber is then opened and the cans are transferred to a conveyor mechanism delivering througn a connecting tunnel to a room in which the containers are sealed, this room being under the same vacuum or gas condition as that established in the prevacuum chamber.

A small safety valve is interposed between the prevacuum chamber and the tunnel and is opened periodically to permit passage of a group of cans and closed air tight after each passage.

In the sealing room the cans are now conveyed towards the sealing machine. The covers on the cans, which had been loosely clinched to the latter, so as to permit the air to escape from the product during vacuumization, are now seamed and spun to the top flange of the cans to hermetically close the same.

Thereafter the cans are carried on a conveyor belt out of the sealing room through the tunnel into a discharge unit. A safety gate similar to that between the prevacuum chamber and the tunnel is provided between the tunnel and the discharge unit. After the cans have been delivered to the discharge unit, a gate is closed to seal the latter from the sealing room and the tunnel, atmosphere is permitted to enter, the outer gate of the chamber is opened and the sealed cans are delivered onto a discharge belt which will convey the same away from the machine.

The chamber, being free of the cans, will be closed by the outer gate and prevacuumized thereafter, to permit the inner gate to be opened without losses of either vacuum or a selected gas in the corridor and sealing room.

The present application is a continuation in part of application from Patent Serial No. 655,733, filed February 8th, 1933.

In the present invention filled cans 24 to be sealed are conveyed in a continuous succession to the prevacuum chamber on a belt 25 passing over a pulley 26. The belt 25 may be driven by any suitable means as for example by a motor 27 and chain transmission 28. The motor may be mounted on a supporting frame 29 of an intake unit 30 of which the prevacuum chamber 32 forms a part. The cans are stopped by a stop 31 on the frame in position to enter the prevacuum chamber.

A predetermined number of cans are permitted to pass to a position to enter the prevacuum chamber and succeeding cans are intercepted until those in position have entered the chamber whereupon a second group is permitted to pass to entering position and this sequence is repeated. For this purpose the cans pass a turnstile 33 having arms that project over the belt in position to be moved by the passing cans so that as each can passes it rotates the turnstile a predetermined angle. When a predetermined number of cans has passed, the turnstile is stopped by a control mechanism until the group of cans in position has entered the prevacuum chamber whereupon the turnstile is released for the passage of succeeding cans. The control mechanism is not shown in detail because it does not form a part of this invention and because mechanisms of this type are sufficiently known to this art. It may be released and stopped by any one of the various machine elements which operate in timed sequence. A more detailed description, however, of a turnstile of the type shown, may be obtained from the pending application Serial No. 655,733 above referred to.

The cans are delivered into prevacuum chamber 32 by means of a horizontal push rod 35 mounted at its ends on knee shaped arms 36 keyed on a rock shaft 37, which is journaled in bearings on the upper part of chamber 32. The shaft 37 is rocked by a lever 38 driven by a pneumatically operated piston rod 39 in a cylinder 40 on the side of unit 30.

After the cans have entered chamber 32, the latter is closed by means of an outer vertically operated rectangular valve gate 42 pneumatically raised and lowered by rods 43 connected to pistons 44 in cylinders 45. The latter are shown mounted to the inside of the outer legs of lower frame 29 in any well known manner.

The filled containers in closed chamber 32, Fig. 4 are now subjected to a change in gaseous pressure in that the air is exhausted through a pipe 46, Figs. 4 and 14 connected at either the upper wall as shown, or at the lower or the sidewalls of the chamber to suit conditions.

After a vacuum has been created in chamber 32, an inner vertically disposed valve gate 48, similar to gate 42, is lowered to open the chamber to the passageway 47. Gate 48 is pneumatically lowered and raised by means of pistons 49 in cylinders 50 mounted alongside cylinders 45 on lower frame 29. This gate, like gate 42, is a plate connected with pistons 49 by means of rods 51. Gate 48 is lowered into a valve or gate chamber 52 made airtight by suitable packing and stuffing boxes at the connecting rods 51. Chamber 52 is connected to and has the same gaseous pressure as the corridor and sealing room, to prevent pressure differences on the gate, which otherwise would cause the atmospheric pressure to act on the lower end surface of the plate and influence the force in the pistons accordingly.

After lowering gate 48, the cans are transferred from the prevacuum chamber into passageway 47 by means of a pushrod 55 on arms 56 which are secured to a rock shaft 57 located within chamber 32 above the top of the cans. This shaft is mounted on the side walls of this chamber in any suitable manner and passes through one of said walls so as to be operable by means of a piston 58 in cylinder 60, Fig. 3. Piston 58 is linked to a lever 61 with a gear sector 62, both of which are operably mounted to one side of unit 30. Sector 62 engages a pinion 63 which is fast to shaft 57, so that piston 58 can rock this shaft and actuate pushrod 55 accordingly.

The weights of the gates 42, 48 are each counter-balanced by heavy spiral or clock springs 65 in a housing 66, Figs. 5, 6 and 7. This housing is held to frame 29 and retains the inner end of the spiral spring on a hub 67. The outer end is fastened in a suitable manner to a circular cover plate 68. The latter is attached to a shaft 69 by a clamp device 70, Fig. 7. Shaft 69 extends over almost the entire length of the unit and is preferably connected with more than one of the counterbalancing devices described as shown in Fig. 2 at both ends of shafts 69. These shafts are connected to piston rods 44, 49 with suitable sprocket wheels 71 and chains 72, Fig. 4 and whenever these rods are lowered, the spiral springs are wound up. This permits a considerable reduction in air pressure for lifting the gates.

The cans are conveyed in the passageway 47 toward the sealing chamber by a belt 75 driven by a pulley 76 on a shaft 77, Fig. 8. The latter is rotated by chain transmission 28, through a clutch 78 which engages shaft 77 with transmission shaft 79. Passageway 47 is provided with a safety valve gate 80 Figs. 1 and 8, to close the opening through which the containers are led out of the passageway. Angular disposed guideplates 81 direct the containers to pass from belt 75 onto the belt 82 through this opening.

Valve gate 80 located between these belts is raised and lowered by a piston 85 in a cylinder 86. The latter is fastened by means of a bracket 87 to the cover frame 29, Fig. 2.

It is desirable to have both belts 75, 82 as close to each other as possible so as to insure a positive transmission of containers from one belt to the other without a loss in speed. For this reason the side edges 88 on which gate 80 is guided, are offset in opposing directions, as shown in Figs. 1, 9 and 10. The distance between the belts need therefore be only sufficient to clear the thickness of gate 80.

In order to prevent a leakage, the valve gates as 42, Fig. 11, may be provided with suitable packing strips 90 pressing against the gate surfaces. These packings are preferably located in recesses of the stationary walls 91 of the unit and comprise strips of leather or other suitable material which is folded in a double layer having therebetween a metal strip 92. The metal strips are fastened therein by means of screws 93 in such a manner as to secure one fold of the leather and leave the other free to press against the valve gate.

Piston 85 of the gate 80 is provided with a roller extension 95, Fig. 8 which depresses a lever mechanism 96 whenever gate 80 is lowered. This mechanism in turn closes clutch 78 and thereby causes belt 75 to operate to deliver the cans onto belt 82. When the gate 80 is raised a spring 96ª returns the lever 96 and thus releases the clutch 78 and the belt 75 is stopped automatically.

Belt 82, located within tunnel 100, Figs. 1 and 2, is operated by a conventional chain drive 101, which is connected with a positive drive chain conveyor 102. The latter is rotated by and forms a part with a sealing machine 103. The cans are delivered from belt 82 onto conveyor 102 by means of a conventional worm feed 104 to space the cans in definite relation to each other and to that of the openings of turret 105 of the sealing machine. This turret delivers the cans into the rotating sealing head 106 where they are hermetically sealed. The various mechanisms of the sealing machine do not form a part of this invention and are therefore not shown in complete detail.

After the cans are sealed, they are delivered on the conveyor 107 which is driven by the sealing machine through suitable helical or other type of gearing 108. The sealed cans passing from the sealing room 110, through tunnel 100 are delivered into the discharge unit 111. This unit is identical to intake unit 30 but does not possess the clutch mechanism 78 to start and stop the belt in the passageway. The cans carried by the conveyor 107 are directed into passageway 112 of unit 111, by means of angularly disposed guideplates 113, and are received on a conveyor belt 114 in the latter. After a group of cans has thus been delivered on the belt 114 located in the passageway, the tunnel compartment may be closed by means of a valve gate 115 located between belts 114 and 107. This gate which is similar to gate 80 is operated by a piston 116 in a cylinder 117, Fig. 8. Belt 114 is driven by a conventional pulley transmission 118 rotated by a motor 119, Fig. 1. After a group of cans has arrived in the passageway 112, an inner valve gate of a discharge chamber is lowered by its piston 121 and cylinder 122, Fig. 4. This gate is identical to gate 48 and moves in a gate chamber 123 which is made airtight. The cans are then moved into a discharge chamber 125 by means of a rocking push rod mechanism 126 operated by a piston in cylinder 127, Fig. 3, and identical in its operation to that of rock shaft 37 and cylinder 40. The air will be permitted to enter the discharge chamber through a pipe 128 as soon as the inner valve gate 120 has been closed. This will equalize the air-pressure on the outer valve gate 130. The latter is then lowered by means of pistons 131 in cylinders 132 fastened to lower frame 129 of unit 111.

The cans are ejected from the discharge chamber by a gear operated pusher mechanism 133 identical to the one of prevacuum chamber 32. Mechanism 133 is operated by a piston 134 in cylinder 135, Fig. 1, and delivers the cans onto the discharge belt 136 on pulley 137 held on shaft 118.

After the cans have been discharged the gate valve 130 is closed, air is exhausted from the chamber 125 through the pipe 128 until the interior of this chamber is under the same vacuum as the passage 100 and chamber 110 and then the gate valve 120 is opened.

Respective intake and discharge units 30 and 111 are held together by suitable brackets 138.

The sealing machine is driven by a motor 139 through reduction gearing 140.

If for certain reasons the cans in the discharge unit 111 should be stopped and be prevented from passing out of the unit, a safety device in form of an automatic circuit breaker 141 is provided which may be located within the sealing room of conveyor belt 107, Figs. 1 and 13.

This circuit breaker comprises a constantly rotating turnstile 142, traveling in unison with the cans.

The turnstile is rotated by a shaft 143 which is driven by a chain 143ª from the machine 105 and is provided with helical teeth on which the turnstile is carried. If a can is stopped in the turnstile and prevents it from rotating, the teeth 144 will lift the former and thereby actuate a mercury contact switch 145, which in turn will connect a main circuit and stop all operating mechanisms. A snap device for the retention of the turnstile in either a raised or a lowered position on shaft 143 may comprise a spring operated ball 146 locating itself in either one of two vertically disposed grooves within the sleeve of the turnstile.

After the trouble, stopping the cans, has been eliminated the operator will push down the raised turnstile, which will lower switch 145 and make the machine again ready for operation.

Operation and control

To actuate and control the various piston-operated gates and transmitting levers in timed sequence, fluid power distributors 148 and 149, Figs. 14 and 15, are applied, of the type described in our co-pending application for Patent Serial #709,198 filed Jan. 31, 1934. These timing mechanisms are driven from the gearing 140 through a shaft 170 and are thereby synchronized with the capping machine.

Each distributor comprises a housing 150 with a coverplate 151 to which are connected suitable feed pipes of which one set of pipes 152 serves the purpose to distribute the fluid pressure to one end, and another set 153 to the other end of the cylinders operating the pistons.

Against the inner surface of coverplate 151 is held a rotor 154 slidably keyed on a driveshaft 155. This rotor distributes and releases the fluid pressure in these pipes through respective openings 156 and ducts 157 permitting the fluid to escape through the latter out of regulatable valves 158 or other suitable openings. The slowly moving rotor maintains a pressure within the various feed pipes for different periods of time depending on the period of operation of each cylinder.

The fluid pressure in the housing of each rotor is supplied through pipes 160. These connect with a main pipe 161 which leads from a pressure pump 162, Fig. 14. Suitable hand operated valves 163 on pipes 160, 161 serve to shut off the pressure on either one or both of the distributors.

The arrangement of pipe connections between each set of cylinders and their respective distributors is such that the operation of the rotating control disc 154 coincides with the sequence of operation of the cylinders and the respective stages of displacement of the cans.

The pipes on the coverplate 151 may be located on circles of different radii but on not more than only a part over their entire circumferences. During the time ducts 156 pass over that part of the coverplate which is free of pipe connections, the prevacuum chambers of either unit 30 and 111 are closed entirely. In the meantime air is being exhausted from either one of the chambers through their respective pipes 46 and 128. The latter are connected to an exhaust pump 165 of any desirable construction. The air is exhausted from the prevacuum chambers in timed sequence by means of cam-operated valves. Both sets of cams 166, 167 and 168, 169 control the exhaust of respective units 30 and 111 and are fastened to an extension 170 of shafts 155 of distributors 148 and 149, which are preferably joined by means of a coupling 171.

Cam 167 which opens a valve 173 for an exhaust of chamber 32 through pipes 46 has a contact surface which will gradually open valve 173, so as to subject the cans in the prevacuum chamber to an uninterruptedly increasing degree of exhaustion of air.

In thus gradually withdrawing the air from the cans, their contents will not be disturbed and an overflow and spillage of the product is thus obviated. After the cans have travelled out of the chamber 32 and gate valve 48 of the latter has again been closed, cam 166 opens a valve 172 to permit air to enter into this chamber so that the same may be opened to the atmosphere and receive the next group of cans.

Cam 169 opens a valve 175 for the exhaust of air from the discharge chamber 111 shortly after the closed cans are ejected and valve gate 130 has again been closed. Cam 168 operating a release valve 174 will cause air to enter the chamber while the same is closed and while a group of cans is retained therein. This will release the atmospheric pressure on valve gate 130 and permit the same to be opened without frictional resistance against the same.

While in the present disclosure of our invention we show only one cam 167 for a gradual and constant withdrawal of air from chamber 32, we may also employ two or more of these cams and respective valves as shown in the referred to application for Patent Ser. #655,733.

The vacuum in the sealing room 110 is preferably maintained by a separate exhaust pump 176 connected to the room by a pipe 177 having a two-way valve 178 which may connect the room to either pump 176 or to the atmosphere for a release of the vacuum.

In order to provide a vacuum sealing mechanism which can be easily controlled and will be accessible to all its parts, as well as permit a speedy elimination of any troubles that may arise during operation, we employ certain safety controls and other suitable devices which will make for security in operation and saving in time.

A considerable time saving factor is the provision of tunnel 100 and the consequent separation of the intake and discharge mechanisms from the sealing room. The space made available on the walls of the room by means of this development is considerable. It is possible to provide doors 180 to all sides of the room except the one to which the tunnel housing is connected. This, therefore, permits an easy approach toward the sealing machine from three or more directions depending on the number of walls of the room. Windows 179 in each one of these doors allows an attendant to observe the machine and easily detect faults and imperfections during operation. Tunnel 100 may be provided with one or more doors 181 if so desired, Fig. 2, to further increase accessibility.

Passageways 47, 112 may be approached from the outside through the respective inlet and outlet chambers 32, 125. Ordinarily one of the valve gates of either chamber is always raised. In order to make the passageways accessible, however, while the power distributors 148, and 149 are idle, the operator may cause a pressure from main pipe 161 to enter pipes 152 at the top of the valve gate pistons of the chambers 32 and 125 through respective three way valves 182 one of which is provided for each chamber. This is done after the pressure which raises the pistons has been duly released through similar valves 183, permitting the valve gates to be lowered and the passageways to be opened accordingly.

A safety control in either one of the units 30 and 111 is the provision of the two safety valve gates 80 and 115, which close the passageways 47, 112 against tunnel 100 in timed sequence. Whenever the respective inner valve gates 48, 120 are open or being opened the safety valve gates 80, 115 are closed and the latter will not be opened until gates 48, 120 are closed. The purpose of this feature is to prevent any losses in vacuum in the sealing room and tunnel if a jam or other unforeseen conditions should develop at, or on the inner gates. If, for some reason, either one of the latter is prevented from being closed, the respective safety gates 80, 115 will not open. This will then permit the operator to lower both gates of either one of the units through valves 182 and remedy the conditions, leaving the vacuum in the sealing room undisturbed, thus saving time and cost in operation.

The operation of the safety valve gates is directly controlled by their correlated inner gate valves which close the corridors to the prevacuum and discharge chambers. To pistons 49, 121 of inner gate valves or to the extensions of these pistons are secured arms or tongues 184 each operating a slide valve 185, Figs. 12 and 14. Both of these valves are connected to the pressure supply pipe 161 by means of pipes 186 and to opposite ends of cylinders 86, 117 of respective safety gates 80, 115 by means of pipes 187 which act alternatively as pressure and exhaust pipes.

Each valve 185 has a spring-operated plunger 188 tending to reach the lower level in the housing of the valve, and connecting the pressure pipe 186 to the upper parts of cylinders 86, 117 when the extensions 184 have reached their maximum elevation. This means that as soon as the inner gates 48, 120 have closed the prevacuum chambers, the safety gates 80, 115 are lowered and the corridors are opened to the tunnel compartment. After the cans have passed the safety gates, the latter will again be raised as soon as the prevacuum chambers have been vacuumized and their respective inner valve gates are again to be lowered in the sequence of operation previously described. As soon as these inner gates pass downward, plungers 188 of slide valves 185 will disconnect the pressure from the upper pipes of safety cylinders 86, 117 and transfer the connection to the lower pipes, which will cause the respective safety gates to be raised. The compressed air to be exhausted from the upper or the lower pipes 187, Fig. 12 will pass through respective parts of the valve housing into the atmosphere through needle valves 189 which may be adjusted to control the speed of the pistons.

Stopping conveyor belt 75 whenever safety gate 80 is being raised, Fig. 8, serves a twofold purpose. If the cans on belt 75 cannot move towards gate 80 until the latter has entirely cleared the entrance into the tunnel, no possibility exists of the first can touching the still moving gate and being tilted. The other reason for stopping belt 75 is that since the time before lowering gate 80 is dependent on the movement of the inner valve gate 48, the first cans would, during their movement, wedge against the small gate 80 and cause frictional resistance against the same while being raised.

A further control for a safe operation of the container feeding and sealing mechanisms comprises certain electrically operated valve mechanisms illustrated in Figs. 16, 17. One of the main purposes of this safety control is to automatically stop the operation of both the large valve gates 42, 48 of the intake unit 30, should anything arise to prevent a satisfactory operation of same, as for instance a can being caught by a moving gate. Another purpose is to automatically stop the entire mechanisms, should anything unforeseen develop on the large valve gates 120, 130 of discharge unit 111. This will prevent the machine from being further charged with unsealed containers.

The control for these operations is obtained by means of electro-magnetically operated valves connected to the various pipelines already referred to.

The large valve gates of both units 30 and 111 each operate, by means of a pin or in any other suitable manner, a mercury contact switch 191 on a lever 192, Fig. 17, at the moment the gates reach or leave their seats for closure. This will respectively connect or disconnect the severally related branch circuits 193, 194 of the electric main circuit 195, Fig. 16. Another set of like contact switches 196, operable through cams 166 to 169 inclusive, are interconnected with both branch circuits.

The operation of the electric safety control is as follows: During an uninterrupted operation of the inner and outer gates of intake unit 30, mercury switches 191 will operate in opposite relation to mercury switches 196, so that circuit 193 remains constantly open and inoperative. If, however, the outer or the inner gate of unit 30 is prevented from closing, branch circuit 193 will be connected at these gates through one of two mercury switches 191. While shaft 170 keeps rotating, one of the cams 166, 167 will raise a mercury switch 196 and cause circuit 193 to be closed. This will excite the two solenoids 197, 198 and close the respective valves 199, 200 connected to power distributor 148 and exhaust pipe 46 in related order. The result will be that the power to operate gates 42, 48 is cut off and that the periodic exhaust of prevacuum chamber 32 is discontinued. While the mercury switches 196 will be continuously raised and lowered by cams 166, 167 during the rotation of shaft 170, both valves 199, 200 will remain closed. The operator may now close the related hand valve 163 of distributor 148 and thereafter remedy, or eliminate, the cause of the trouble. He may also, if required, lower both gates by means of the three-way valve 182 in the manner already described. Before the machine is again set in operation, the plungers of solenoids 197, 198 will be relocated by the operator. To do this he may temporarily open the circuit by handswitch 201 and stop the rotation of shaft 170. Should it be desirable, however, to keep the discharge unit operative so as to eject all cans still within the sealing room, shaft 170 will be kept rotating and switch 201 only may be opened. Should anything unforeseen happen at the gates 120, 130 of the discharge unit 111, the gate-operated switches 191 of this unit will make contact. If now either one of the cams 168, 169, actuating mercury switches 196 of circuit 194 will cause this circuit to be closed, three solenoid magnets will be operated. Of these, the solenoid 205 will open a switch 206 to disconnect motor 139 from main circuit 195, solenoid 207 will operate a valve 208 near exhaust pump 165 preventing the vacuum chambers of both units from being exhausted, and solenoid 209 will operate a valve 210 on pressure pipe 161, to close the latter and thus shut off the fluid pressure from both distributors 148 and 149.

Since, by means of the three solenoids 205, 207 and 209, the respective basic sources of mechanical operation, of power of air exhaust and of fluid pressure are thus eliminated, all operations of the conveying and sealing mechanisms will stop automatically.

This same automatic stop is accomplished by the circuit breaker 141 of which its mercury switch 145 will connect circuit 194 as soon as the cans are prevented from leaving discharge unit 111.

*Application of selected gas*

While various attempts have been made to apply an inert gas to food products in containers by means of automatic machinery and in a manner to be really effective for purposes of preserving, the difficulties inherent in various types of mechanisms so far developed were too numerous to apply such a gas economically, without loss in time and too great a leakage of gas into the atmosphere. Considerable losses in gas may occur through inefficient closures in the operating valves through which the cans are to pass, or if the cans are stopped, through defects in operation.

In applying the conveying and sealing mechanism described to this manner of sealing, the principal parts of the same are identical to those illustrated in the drawings. A difference between the vacuum packing machine and the one applicable for gas treatment is in the addition of a pump, tank and piping as required for gas.

In the diagrammatic arrangement of Fig. 20, a sealing room 110' is connected by means of tunnel 100' to both the inlet and discharge units 30' and 111', as in Figs. 1 and 2. The prevacuum chamber of unit 30' is closable by means of respective inner and outer valve gates 42', 48', while the discharge chamber of unit 111' has respective inner and outer valve gates 120', 130'. Both pairs of valve gates are actuated through the respective distributor valves 148' and 149' in the same manner as in Figs. 1 to 13. A shaft 170' rotating with these valves carried cams 166', 167' to operate respective valves 172', 173' connecting the pipe 46' to the exhaust or to suction pipe 230 respectively leading to vacuum pump 165'. Another set of cams 168', 169' on the same shaft operate respective valves 174', 175' similarly connecting the pipe 128' to suction and exhaust. The vacuum pump 165' is also applied to draw a vacuum in the sealing room through pipe 177', before a gas is admitted thereto. While a gas is in the room, the vacuum pipe connection is shut off through hand valve 178'. In the gas sealing mechanism so far described the various parts disclosed are all identical to the vacuum sealing machine. They, therefore, have received like numerals of identification with prime marks added thereto.

After the air has been exhausted from the sealing room inert gas, such as nitrogen, is supplied thereto through a valve controlled pipe 215 connected to a cylinder 216 containing the gas in compressed or liquefied form. The prevacuum chamber 30' and the discharge chamber 111' are cyclically filled after each vacuumizing with gas supplied from the chamber 110' through a pipe 217 and branch pipes 218 and 219 controlled by suitable valves. Since, however, both these chambers are periodically opened and closed to the atmosphere, the gas is supplied to the chambers and withdrawn therefrom in timed relation to the periodic operation of the valve gates of each chamber.

The withdrawal of gas from each chamber is made by means of a suction pressure pump 220 which draws the gas through a cleaning and purifying mechanism 221, connecting through a pipe 222 to both branches 218, 219 of the main pipe 217. The latter is also directly connected with pipe 222 through a by pass pipe 223 which is provided with a hand valve 224 kept closed while the machine is in operation.

Pump 220, when drawing the gas from a chamber, 30' or 111', will at the same time deliver an equal amount of purified gas into a storage tank 225, connected with suitable piping 256 to the interior of sealing room 110'.

The withdrawal and supply of gas from and to each of the chambers 30' and 111' is controlled by means of cams on shaft 170'. Cams 226, 227, 228 and 229 in definite angular relation to each other and to the other cams on shaft 170', operate respective valves 232, 233, 234, 235 of which the first two valves connected to pipes 218, 222 will permit a respective injection or withdrawal of gas to and from the chamber of unit 30'. Similarly valves 234, 235 connect to pipes 219, 222 for charging and emptying the chamber of unit 111' in timed sequence.

Cams 166', 167' and 226, 227 are located on shaft 170' in definite relation to the rotor disc within distributor valve 148', while cams 168', 169' and 228, 229 are dependent in their location to that on the shaft of the rotor disc in distributor valve 149'. The rotor discs of both valves, however, are not strictly bound to each other's position in that their relative location is dependent on the time required to convey the cans from the prevacuum chamber of the intake unit, to that of discharge unit 111'.

The cycle of operation for each unit is, however, identical and on the intake unit 30' is as follows: Assuming both gates 42' and 48' to be raised and the gas to have been withdrawn from the chamber, cam 166' opens valve 172' to let the air enter the chamber. Valve gate 42' is thereupon lowered to permit a new group of cans to enter, after which gate 42' is raised again. The air is now withdrawn from the closed chamber by means of the opening of valve 173' connecting to exhaust pump 165' through pipe 230. After exhaust valve 173' has been closed, gas valve 232 is opened to connect pipe 218 with the main gas pipe 217 and permit the gas to enter into the prevacuum chamber. Cam 226 operating valve 232 is provided with a surface which will open this valve gradually so as to prevent the gas entering suddenly into the chamber and disturb the contents in the containers. Thereafter gate 48' is lowered and the unsealed cans pass to the sealing room. Gate 48' is then raised and the gas in the closed chamber is withdrawn by opening valve 233 to connect pipe 218 with the exhaust pipe 222. The gas passing therethrough will enter the gas filter 221 and will thereafter be transmitted into tank 225 by means of the exhaust pressure pump 220, to then again pass into sealing room 110'. After the gas has thus been withdrawn from the chamber of unit 30', air will again enter the same through the opening of valve 172' and the cycle of operation will be repeated in the manner described.

It will thus be possible not only to prevent losses in gas in that the quantities in the chambers are being retrieved, but also to subject a definite amount of the gas to circulation and thus permit it to be purified during its travel and again enter the room in which the cans are to be sealed.

In order to prevent losses of gas through leakages or through faulty operation of the mechanisms, we provide certain novel features which will automatically eliminate any such losses. One of these features comprises a positive airtight seal of the valve gates against leakages while the gates are to act as closures. Referring to Figs. 18 and 19, a gate 237, which may represent any of the various valve gates already described, is opposed at its edges on both sides of its surfaces by rubber tubes 238, whenever it closes the part of a chamber or compartment housing 239. Both tubes are imbedded within the metal walls of the housing near the edges of its part in a manner as to permit gate 237 to move freely without touching the tubes. Each tube 238 is connected at one or more places to an air pressure tube 240 provided with a double acting valve 241, which is automatically opened and closed by a lever 242 actuated by a cam 243.

The latter is rotated by a shaft 244 which may be geared either to shaft 155 of distributor valves 148 and 149, Fig. 15 or be an extension thereof, so that valve 241 will be opened and closed in timed relation to the movement of gate 237. Tube 240 is fed by a pipe 245 which may be connected to the pressure pipe 161, Fig. 14, or to any other source of fluid pressure. Whenever lever 242 is being moved in one direction fluid pressure will enter tubes 238 causing them to expand and to press their exposed surfaces against gate 237. This will positively close the gate against any leakage of gas. It will also prevent a loss of vacuum, should this seal be used on vacuum appliances as well.

A movement of lever 242 in an opposite direction will close pipe 245 and release the pressure in tubes 238, 240 to the atmosphere, permitting gate 237 to be moved with comparatively little frictional contact thereafter. Each of the valve gates, therefore, will be supplied with the gate seal described, of which both gate and seal will be operated in synchronism with their respective distributor valve 148' or 149'.

Other safety features which prevent losses of gas, are electrically operated valves which close the feed pipes automatically whenever the sequence of operation is being interrupted.

In Fig. 21 which is similar to Fig. 16 the various control and safety devices for the use of a selected gas are shown. In this figure those parts that duplicate like parts in Fig. 5 have received like numerals with a prime mark attached to each such numeral and operate as described in Fig. 16. Of the added piping for gas, the main pipe 217, the branch pipe 218 and the gas return pipe 222 are each provided with respective electrically operated safety valves 247, 248 and 249 which are similar to those previously described.

The electromagnet 250 of valve 248 is connected in parallel with magnets 197', 198' operating the respective safety valves 199', 200' on branch circuit 193', so that if one of the two valve gates 42', 48' are prevented from being shut, all three valves will be automatically closed in the manner previously described, so that in case of an interruption in operation, the intake unit 30' will automatically cease to function and the flow in both the vacuum and gas supply pipes will be stopped. Cam 227, operating valve 233 on the gas outlet pipe, also actuates a mercury contact switch 246 connected in parallel with a switch 196' of valve 173'. This switch takes the place of a switch 196 formerly operated by cam 166, Fig. 16. The reason for actuating switch 246 through cam 227, and not through cam 166' is that the former is closer in timed relation to the operating valve gates and will actuate the switch sooner than the other cam, should a faulty operation develop.

Safety valves 247, 249 are operated by respective electro magnets 251, 252 which are connected in parallel with magnets 205', 207' and 209' in circuit 194'. The mercury switch 246' at valve 234 actuated by cam 228 and connected in parallel with switch 196' serve the same function as switch 196 actuated by cam 168, Fig. 16. Whenever one of the valve switches 196', 246' make contact with either one of the switches 191' operated by gates 120', 130' branch circuit 194' will be closed, thereby actuating five magnets which will stop motor 139' and close valves 249, 247, 208' and 209' thereby discontinue the operation of all mechanisms as well as obstructing the flow of gas and end the suction and pressure operations in the respective pipes connected to these valves.

If it is required to open the housing of sealing room 110', the selected gas therein may be saved if the hand valves 254, 255 of respective gas cylinder 216 and main pipe 217 are closed. The gas will then be drawn through pipe 223 and valve 224 now open, into the purifier 221 and through thereinto storage tank 225. Pipe 256 leading from this tank into the sealing room is, during this time closed, by a valve 257. To draw the gas out of branch pipes 218, 219 the operator may open the various valves 232 to 235 to connect the branch pipes to pipe 222.

While the conveying and sealing mechanisms, as shown in Figs. 1 and 2, have the inner conveyors 82, 107 which pass into and out of the sealing room, located close to each other, it may, of course, also be possible to displace the same relative to each other. Fig. 22 shows an outline of a displacement of conveying mechanisms which differs from that shown in Fig. 1. Sealing room 261 and its sealing machine 262 as well as tunnel 263 which connects the room with the transfer appliance 264 are all substantially similar to those previously described. The difference between the two designs is that in Fig. 2 room 261 and tunnel 263 have been widened and transfer unit 264 has been narrowed accordingly. The respective intake and discharge conveyor belts 266, 267 of the sealing room have been separated and conveyor belts 265, 268 of the transfer unit placed between the same, so that the cans supplied by conveyor 269 and passed through the prevacuum chamber 270 onto belt 265, will now be guided through safety gate 271 in a direction opposite to that disclosed in Fig. 1. The cans passing through this gate onto belt 266 are sent into the sealing machine in the manner previously described. After sealing, they are transferred to a rotating conveyor disc 272 which transmits the cans, guided by rails 273, onto belt 267. They then pass through safety gate 274 in a direction towards the middle of the machine onto belt 268, from where they are delivered through the discharge chamber 275 onto discharge conveyor 276 in the manner described in the previous machine.

The modification of Fig. 23 discloses a displacement of conveyor belts, which might be referred to as a combination of the two arrangements shown in Figs. 1 and 22. In Fig. 23 the cans coming over intake conveyor 279 and passing through the prevacuum chamber 280, are placed on the corridor conveyor belt 281 which, in turn, transmits the cans through safety gate 282 in a direction alike to that shown in Fig. 1 onto the intake conveyor belt 283 of tunnel 284. The sealed cans conveyed out of this tunnel by means of belt 285 pass through safety gate 286 in a direction toward the middle of the machine, alike to that shown in Fig. 22. The cans, sliding onto belt 287, of the outlet corridor, are delivered through prevacuum chamber 288 onto discharge belt 289 in a manner which is alike to that previously disclosed. It is thus possible to reduce the width of the sealing machine with its tunnel and that of the transfer unit to a medium dimension, if so desired, or to adopt one of the three arrangements described to meet certain requirements, as for instance, to comply with suitable belt connection for a certain type of sealing machine purchasable on the market, the size of which differs from that of other types of sealing machines.

The various types of conveying and sealing machines of Figs. 1, 22, 23 all refer to an application of vacuum or gas for sealing purposes and the use of safety gates 80, 115, Fig. 8, as a protection against losses in either vacuum or gas, the latter being the most vital in that the losses in gas are generally more expensive than those of a vacuum.

Whenever cans are to be packed under a vacuum, and it is believed that the cost of producing a new vacuum is negligible in relation to the capacity of production of such a machine, the safety gates referred to may be dispensed with. This would then permit each pair of both the intake and discharge conveyor belts of tunnel 3 to be joined to those of respective passageways or corridors 47, 112.

An arrangement of this type is illustrated in Fig. 24, in which the cans, supplied by the outer belt 290 and transmitted through the prevacuum chamber 291 in the described manner, are placed on a conveyor belt 292 which is directly connected with tunnel 293, so that the cans may pass towards the sealing machine in a straight line.

The same condition prevails relative to discharge belt 294 of the sealing room, which conveys the sealed cans in a direct line towards the rear gate of prevacuum chamber 295 through which they are passed onto the outer discharge conveyor 296 in the manner set forth. The corridor 297 wherein belts 292, 294 travel has no partition between the belts. At this location is positioned a pushbar 298 with knee shaped levers 299 identical to respective bar and levers 126 of corridor 112, Fig. 4 and operated in the same manner.

The various new methods of operation relate in the main to the conveying of containers in certain directions, in timed sequence relative to operating instrumentalities. Another method relates to the closing of a port. A further method comprises the closing of a port airtight by fluid pressure.

Under this automatic process of sealing cans either under conditions of low atmospheric pressure, or controlled gaseous pressure, it is possible to handle simultaneously not only groups of twelve, but of double, triple or quadruple this quantity without changing the conditions under which the process is intended to operate. In fact, for the first time in the history of packing it is made possible to pass cans from the atmosphere through steady and progressive pressure alterations back again to the atmosphere, and during their travel to seal them either in a sealing area of low atmospheric pressure, or in an area of controlled gaseous pressure, at greater speeds and in greater numbers per minute than closing machines are at present built to close cans.

Since various changes of construction are possible within the scope of our invention, we desire to have it understood that the disclosure illustrated in drawings and described above are to be considered illustrative only and not in a limiting sense.

What we claim and desire to secure by Letters Patent is:

1. In mechanisms of the character described, a sealing means, means to move containers to and from said sealing means, means to change the directions of travel and to stop said containers during said movements, and means to subject the sealed and unsealed containers while stopped before and after sealing to changes in gaseous pressure.

2. In mechanisms of the character described, a sealing room, a sealing machine in said room, a unit comprising enclosures for receiving unsealed and discharging sealed containers, means for vacuumizing said enclosures, a corridor connecting said enclosures and said sealing room, means to transfer containers between atmosphere and corridor through said enclosures, and further means to transfer containers between said sealing room and said corridor.

3. In mechanisms of the character described, a sealing room, a sealing machine in said room, a unit comprising enclosures for receiving and discharging containers, a corridor connecting said unit and said room, means to transfer containers from said corridor into said sealing room and out thereof and further means to close communication in said corridor between said unit and said sealing room.

4. In mechanisms of the character described, a sealing room, a sealing machine in said room, a unit comprising enclosures for receiving and discharging containers, a corridor connecting the enclosures of said unit and said sealing room, means to transfer containers between said unit and said sealing room through said corridor and to retain the containers temporarily stationary therein during said transfer.

5. In mechanisms of the character described, a sealing room with changed atmospheric conditions therein, a sealing machine in said room, a unit comprising enclosures for receiving unsealed and discharging sealed containers, means for vacuumizing said enclosures, a tunnel connecting said sealing room and the enclosures of said unit and means to transfer containers from the atmosphere through said unit and tunnel into the sealing room.

6. In mechanisms of the character described, a sealing room with changed atmospheric conditions therein, a sealing machine in said room, a unit comprising enclosures for receiving and discharging containers, means for vacuumizing said enclosures, a tunnel connecting said sealing room and the enclosures of said unit, and means to transfer containers from the atmosphere through said unit and tunnel into the sealing room, and after sealing pass the containers from said sealing room through said tunnel and said unit into the atmosphere.

7. In mechanisms of the character described, a sealing room, a sealing machine therein, a unit for receiving and discharging containers, means to transfer containers into and out of said unit, means to transfer containers between said unit and said sealing room and further means to automatically stop the movement of the containers between said unit and said sealing room.

8. Apparatus of the type described which comprises a room, a chamber separate from and communicating with said room, means to seal and to open said chamber alternatively to the atmosphere and to said room, means to exhaust air from said chamber between its closure to the atmosphere and its opening to said room, means to group cans and convey them as a group into said chamber, and means to convey said cans from said chamber to said room.

9. Apparatus of the type described which comprises a room, a chamber separate from said room, a tunnel connecting said chamber and said room, means to open and seal said chamber alternatively to the atmosphere and to said tunnel, means to pass cans into said chamber when open to the atmosphere and into said tunnel when open to the tunnel, means to exhaust air from said chamber after said chamber is closed to the atmosphere and before it is open to said tunnel, and means for conveying cans through said tunnel from said chamber to said room.

10. Apparatus of the type described which comprises a room, a chamber, a tunnel connecting said chamber and said room, means to open said chamber to the atmosphere and to close said chamber to the atmosphere and then to open it to said tunnel, means to pass cans into said chamber when open to the atmosphere and from said chamber to said tunnel when open to the tunnel, means for exhausting air from said chamber after it is closed to the air and before it is open to the tunnel, means to convey said cans through said tunnel to said room and means to close the passage in said tunnel between said chamber and said room when said chamber is open to said tunnel.

11. Apparatus of the type described which comprises a sealing room, a transfer mechanism, a chamber separate from and communicating with said room, said mechanism comprising pneumatic means for opening said chamber to the atmosphere and to said sealing room alternatively.

12. Apparatus of the type described which comprises a sealing room, a transfer mechanism separate from said room, a communicating passage between said transfer mechanism and said room, pneumatic means for opening said transfer mechanism alternatively to the atmosphere and to said communicating passage, conveyer mechanisms for moving cans between said room and the atmosphere through said communicating passage and transfer mechanism in stages, and means for exhausting air from said transfer mechanism between its closure to the atmosphere and its opening to said communicating passage.

13. Apparatus of the type described which comprises a sealing room, a transfer mechanism separate from said room, a communicating passage between said transfer mechanism and said room, pneumatic means for opening said transfer mechanism alternatively to the atmosphere and to said communicating passage, conveyer mechanisms for moving cans between said room and the atmosphere through said communicating passage and transfer mechanism in stages, means for exhausting air from said transfer mechanism between its closure to the atmosphere and its opening to said communicating passage, and a safety shut-off valve in said communicating passage, said valve closing automatically when said transfer mechanism is open to said communicating passage.

14. Apparatus of the type described which comprises a sealing room, a transfer mechanism comprising an enclosure separate from said room, a communicating passage between said enclosure and said room, a conveyer in said passage, and means to open said enclosure alternatively to the atmosphere and to said communicating passage and to transfer cans while open.

15. Apparatus of the type described which comprises a sealing room, a transfer mechanism separate from said sealing room, a communicating passage between said room and said transfer mechanism, a conveyer mechanism in said passage, said conveyer mechanism comprising two members, the end of one extending past the adjacent end of the other, means to guide cans from one of said projecting ends to the other member, a safety valve between said projecting members, said valve having edges offset beyond the projecting ends of said members.

16. Apparatus of the type described which comprises a sealing room, a transfer mechanism, a communicating passage between said room and said mechanism, a valve opening and closing between said transfer mechanism and said passage, a pair of offset conveyers between said transfer mechanism and said room in said passage, the delivery end of one conveyer extending past the delivery end of the other, means to guide cans from one conveyer to the other, a safety shut-off valve between said conveyers, and means to close said safety valve when said valve between said transfer mechanism and said passage is open.

17. Apparatus of the type described which comprises a sealing room, a transfer mechanism comprising an enclosure separate from said sealing room, a communicating passage and conveyer between said enclosure and said sealing room, means successively to open said enclosure to the atmosphere and to close said enclosure to the atmosphere, to evacuate said enclosure, to open said enclosure to said communicating passage and to close said enclosure to said passage.

18. Apparatus of the type described which comprises a sealing room, a transfer mechanism comprising an enclosure separate from said sealing room, a communicating passage and conveyer means between said enclosure and said sealing room, means successively to open said enclosure to the atmosphere and to close said enclosure to the atmosphere, to evacuate said enclosure, to open said enclosure to said communicating passage and to close said enclosure to said passage, and means to pass cans from the atmosphere to said enclosure when said enclosure is open to the atmosphere and to transfer cans from said enclosure to said communicating passage when open thereto.

19. Apparatus of the type described which comprises a sealing room, a transfer mechanism comprising an enclosure separate from said sealing room, a communicating passage and conveyer means between said enclosure and said sealing room, means successively to open said enclosure to the atmosphere and to close said enclosure to the atmosphere, to evacuate said enclosure, to open said enclosure to said communicating passage and to close said enclosure to said passage, means to pass cans from the atmosphere to said enclosure when said enclosure is open to the atmosphere and to transfer cans from said enclosure to said communicating passage when open thereto, and means for timing the sequence of said operations.

20. Apparatus of the type described which comprises a sealing room, a transfer mechanism comprising an enclosure separate from said sealing room, a communicating passage and conveyer means between said enclosure and said sealing room, means successively to open said enclosure to the atmosphere and to close said enclosure to the atmosphere, to evacuate said enclosure, to open said enclosure to said communicating passage and to close said enclosure to said passage, means to pass cans from the atmosphere to said enclosure when said enclosure is open to the atmosphere and to transfer cans from said enclosure to said communicating passage when open thereto, and means for stopping said mechanism when said enclosure is open both to the atmosphere and to said communicating passage.

21. Apparatus of the type described which comprises a sealing room, a transfer mechanism comprising an enclosure separate from said sealing room, a communicating passage and conveyer means between said enclosure and said sealing room, means successively to open said enclosure to the atmosphere and to close said enclosure to the atmosphere, to evacuate said enclosure, to open said enclosure to said communicating passage and to close said enclosure to said passage, and pneumatic means to pass cans from the atmosphere to said enclosure when said enclosure is open to the atmosphere and to transfer cans from said enclosure to said communicating passage when open thereto.

22. In mechanisms of the character described, a sealing means, means to move containers in successive timed intervals under changing conditions of gaseous pressure toward and from said sealing means, means to change the gaseous pressure between said timed intervals and further means to stop the change of gaseous pressure automatically when the sequence of timed intervals of moving containers is interrupted.

23. In mechanisms of the character described, a sealing appliance, a transfer mechanism and means acting in successive intervals to move containers into said transfer mechanism, means to subject said containers to changes of gaseous pressure in said mechanism, means to move said containers from said mechanism to said appliance, said transfer mechanism having ports through which said containers pass, means to open and close said ports concurrently with the timed movement of the containers and means to stop movement of the containers automatically when a port is not closed in timed sequence.

24. In mechanisms of the character described, a sealing appliance, a transfer mechanism having means to move containers under changes of gaseous pressure through said mechanism into said appliance, said transfer mechanism having inlet and outlet ports through which said containers pass and means to open and close said ports in timed sequence in cooperative relation to the movement of the containers whereby said containers may be fed to said appliance freed from air and further means to keep said ports closed when the timed sequence is interrupted.

25. In mechanisms of the character described, a transfer mechanism and means to move containers under changes of a gaseous pressure through said mechanism, said transfer mechanism having inlet and outlet ports through which said containers pass and means to open and close said ports in timed sequence and cooperative relation to the movement of the containers and further means to keep said ports closed and to stop the change in gaseous pressure when the timed sequence is interrupted.

26. In mechanisms of the character described, a sealing room, a sealing appliance therein, means to convey containers towards and from said sealing appliance under changes of gaseous pressure, said means comprising conveyors located at close proximity and substantially parallel to each other to enable containers to pass from one conveyor to the other, a gate valve located between said conveyors and means to guide the gate of said valve at locations removed from the close proximity of said conveyors.

27. In mechanisms of the character described, a sealing room, a sealing appliance therein, valves, means to convey containers through said valves towards and from said sealing appliance, and means to open said valves for the passage of containers therethrough and to close said valves when the gaseous pressure is to be changed, sealing means for said valves to render said valves air-tight, and further means to apply said sealing means after said valves are closed.

28. In mechanisms of the character described, a sealing room, a sealing appliance therein, valves, means to convey containers through said valves towards and from said sealing appliance, and means to open said valves for the passage of containers therethrough and to close said valves when the gaseous pressure is to be changed, sealing means for said valves to render said valves air-tight, said sealing means comprising elastic material expandible under fluid pressure and means to expand said material after said valves have been closed.

29. In mechanisms of the character described, a sealing room, a sealing appliance therein, valves, means to convey containers through said valves towards and from said sealing appliance, and means to open and close said valves in timed sequence for a successive passage of containers and respective change of pressure, sealing means for said valves to seal said valves to render said valves air-tight and further means to apply said sealing means on said valves and to actuate said sealing means independent of the operation of said valves.

30. In mechanisms of the character described, a room, means to keep a gaseous pressure in said room, a chamber communicating with said room, a sliding gate to close and open said chamber to said room, an airtight gate housing to encompass said gate when open and means to operate said gate and to maintain a gaseous pressure within said housing which pressure is that of said room.

31. In mechanisms of the character described, a sealing room, a sealing machine therein, successive transfer chambers and means to convey containers in groups through said successive chambers between said sealing room and the atmosphere and further means to separate the containers in each group relative to each other before the containers reach said sealing machine.

32. In mechanisms of the character described, a sealing room, a sealing machine therein, successive transfer chambers and means to convey containers in groups through said successive chambers between said sealing room and the atmosphere and further means to space the containers in each group a distance apart during their travel towards said sealing machine.

33. In mechanisms of the character described, a room filled with a selected gas, an outlet chamber communicating with said room, means to enter a product from said room into said chamber, means to close said chamber, and to retrieve the gas thereafter, means to introduce air into said chamber, to open the same to the atmosphere and to remove the product from said chamber, means to close said chamber thereafter and further means to withdraw air from said chamber, to enter gas into same and to open said chamber to said room.

34. In mechanisms of the character described, a room filled with a selected gas, an outlet chamber communicating with said room, means to enter a product from said room into said chamber, means to close said chamber, and to retrieve the gas thereafter, means to introduce air into said chamber, to open the same to the atmosphere and to remove the product from said chamber, means to close said chamber thereafter, means to withdraw air from said chamber, to enter gas into same and to open said chamber to said room and further means to cut off said chamber from said room.

35. In mechanisms of the character described, a room filled with a selected gas, inlet and outlet chambers communicating with said room, means to successively enter and discharge containers through each chamber for a respective inlet and outlet of containers to and from said room, means to remove the gas from each chamber before subjecting its interior to the air of the atmosphere and further means to cut off each chamber from said room.

36. Means for transferring containers between the atmosphere and a sealing room for sealing under conditions other than atmospheric which comprises a transfer chamber open on one side to atmosphere and one another side to communication with said room and closure gates for said open sides slidable vertically downwardly to open position.

37. Means for transferring containers between the atmosphere and a sealing room for sealing under conditions other than atmospheric which comprises a transfer chamber open on one side to atmosphere and on another side to communication with said room, closure gates for said open sides slidable vertically downwardly to open position and springs connected to said closures to counterbalance the weight of said closures.

38. Means for transferring containers between the atmosphere and a sealing room for sealing under conditions other than atmospheric which comprises a transfer chamber open on one side to atmosphere and on another side to communication with said room closure gates for said open sides slidable vertically downwardly to open position and fluid pressure means below said closures to raise and lower them to closed and open positions.

39. Means for transferring containers between the atmosphere and a sealing room for sealing under conditions other than atmospheric which comprises a transfer chamber open on one side to atmosphere and on another side to communication with said room, closure gates for said open sides slidable vertically downwardly to open position, a horizontal shaft extending longitudinally of each of said closures, wheels rigidly mounted at spaced intervals on said shaft, connections from said closures to their respective wheels to transmit the weight of said closures to their respective wheels and springs connected to said shafts to counterbalance said weights.

40. Means for transferring containers between the atmosphere and a sealing room for sealing under conditions other than atmospheric which comprises a transfer chamber open on one side to atmosphere and on another side to communication with said room, closure gates for said open sides slidable vertically downwardly to open position and a fluid pressure means at spaced positions lengthwise of said closures and below said enclosures to move said closures vertically to closed and open positions.

41. Apparatus for transferring containers between atmosphere and a sealing room under other than atmospheric conditions which comprises a transfer chamber spaced from said room, means to move containers through said chamber and to change the gaseous content of said containers in said chamber, a corridor between said chamber and said room, a pair of conveyors in said corridor having the end of one conveyor extending past, and at one side of, the end of the other, means to deflect containers from one of said ends onto the other, means for driving said conveyor, a sliding door between said ends and means operated by sliding said door to open position to stop the driving of the conveyor leading to said door.

42. Apparatus for transferring containers between atmosphere and a sealing room under other than atmospheric conditions which comprises a corridor leading to said room, a pair of conveyors in said corridor having the end of one conveyor extending past, and at one side of, the end of the other, means for driving said conveyor, a sliding door between said ends and means operated by sliding said door to open position to stop the driving of the conveyor leading to said door.

43. Apparatus for transferring containers between atmosphere and a sealing room under other than atmospheric conditions which comprises, a transfer chamber spaced from said room, means to move containers through said chamber and to change the gas in said containers in said chamber, a corridor between said chamber and said room, a closure between said chamber and said corridor, a pair of conveyors in said corridor having the end of one conveyor extending past, and at one side of, the end of the other, means to deflect containers from one of said ends onto the other, means for driving said conveyor, a sliding door between said ends, means operated by sliding said door to open position to stop the driving of the conveyor leading to said door and means operable by the opening of said closure to close said sliding door.

44. Apparatus for transferring containers between atmosphere and a sealing room under other than atmospheric conditions which comprises a transfer chamber, a corridor extending from said chamber to said room, a sliding door in said corridor to close the passage therethrough, a closure between said chamber and said corridor and means actuated by the opening of said closure to close said sliding door.

45. Apparatus for transferring containers between the atmosphere and a sealing room which comprises a corridor connected to said room, a pair of laterally offset conveyors in said corridor, the delivery end of one conveyor extending past the receiving end of the other, means to transfer containers from said delivery end to said receiving end and a sliding door between said side by side ends of said conveyors.

46. Apparatus for transferring containers between the atmosphere and a sealing room which comprises a corridor connected to said room, a pair of laterally offset conveyors in said corridor, the delivery end of one conveyor extending past the receiving end of the other, means to transfer containers from said delivery end to said receiving end, a sliding door between said side by side ends of said conveyors, said door having offset edges beyond the ends of said conveyors sealing into the walls of said corridor.

47. Apparatus for transferring containers between the atmosphere and a sealing room which comprises a corridor connected to said room, a pair of laterally offset conveyors in said corridor, the delivery end of one conveyor extending past the receiving end of the other, means to transfer containers from said delivery end to said receiving end, a sliding door between said side by side ends of said conveyors, and means actuated by the closing of said door to stop the conveyor delivery to said door.

48. Apparatus for transferring containers between the atmosphere and a sealing room which comprises a corridor connected to said room, a pair of laterally offset conveyors in said corridor, the delivery end of one conveyor extending past the receiving end of the other, means to transfer containers from said delivery end of said receiving end, a sliding door between said side by side ends of said conveyors, means actuated by the closing of said door to stop the conveyor delivery to said door, said stopping means comprising a disengageable clutch.

49. Apparatus for transferring filled containers from atmosphere to a sealing room under other than atmospheric conditions which comprises a transfer chamber through which said containers may be transmitted to said room, said chamber being open at one side to atmosphere and at another to said room, a sliding closure between said chamber and said room, an air tight enclosure communicating with said room to receive said sliding closure when in open position and means to close said chamber to atmosphere.

50. Means to control the passage of sealed containers which comprises a sealing machine, means for conveying sealed containers from said sealing machine, a turnstile having arms projecting in the path of said containers, means to drive said turnstile in synchronism with said sealing machine and means actuated upon stoppage of said turnstile by relative movement of said driving means to stop said sealing machine.

51. Means to control the passage of sealed containers which comprises a sealing machine, means for conveying sealed containers from said sealing machine, a turnstile having arms projecting in the path of said containers, means to drive said turnstile in synchronism with said sealing machine and means actuated upon stoppage of said turnstile by relative movement of said driving means to stop said sealing machine, said means comprising cam surfaces between said drive and said turnstile displaceable by relative movement, and an electric switch actuated by said displacement.

52. Apparatus for transferring containers from atmosphere to a sealing room filled with a selected sealing gas which comprises a transfer chamber open alternately to atmosphere and to communication with said room, means to withdraw air from, and supply selected sealing gas to, said chamber between closure to atmosphere and communication with said room, means to withdraw said selected gas and admit air to said chamber after closing communication to said room, and means to purify said selected gas drawn from said chamber.

53. Apparatus for transferring containers from atmosphere to a sealing room filled with a selected sealing gas which comprises a transfer chamber open alternately to atmosphere and to communication with said room, means to withdraw air from, and supply selected sealing gas to, said chamber between closure to atmosphere and communication with said room, means to withdraw said selected gas and admit air to said chamber after closing communication to said room, means to purify said selected gas drawn from said chamber and a storage means to receive gas from said purifier and supply purified gas to said room.

54. Apparatus for transferring containers into and from a sealing room filled with a selected sealing gas which comprises inlet and outlet chambers each opening alternately to atmosphere and to communication with said room, means to withdraw air from and supply selected sealing gas to said chambers between closure to atmosphere and communication with said room, means to withdraw said selected gas and admit air to said chambers after closing communication to said room and means to purify said selected gas drawn from said chamber.

55. Apparatus for transferring containers into and from a sealing room filled with a selected sealing gas which comprises inlet and outlet chambers each opening alternately to atmosphere and to communication with said room, means to withdraw air from and supply selected sealing gas to said chambers between closure to atmosphere and communication with said room, means to withdraw said selected gas and admit air to said chambers after closing communication to said room, said means comprising a pipe having four valves, a gas draw-off pipe between the two inner valves, pipes leading from said chambers to communication between an outer valve and one of said inner valves respectively and gas supply pipes leading to said outer valves.

56. Apparatus for transferring containers into and from a sealing room filled with a selected sealing gas which comprises inlet and outlet chambers each opening alternately to atmosphere and to communication with said room, means to withdraw air from and supply selected sealing gas to said chambers between closure to atmosphere and communication with said room, means to withdraw said selected gas and admit air to said chambers after closing communication to said room, said means comprising a pipe having four valves, a gas draw-off pipe between the two inner valves, pipes leading from said chambers to communication between an outer valve and one of said inner valves respectively, gas supply pipes leading to said outer valves and a purifier in said draw-off pipe.

57. Apparatus for transferring containers into and from a sealing room filled with a selected sealing gas which comprises inlet and outlet chambers each opening alternately to atmosphere and to communication with said room, means to withdraw air from and supply selected sealing gas to said chambers between closure to atmosphere and communication with said room, means to withdraw said selected gas and admit air to said chambers after closing communication to said room, said means comprising a pipe having four valves, a gas draw-off pipe between the two inner valves, pipes leading from said chambers to communication between an outer valve and one of said inner valves respectively, gas supply pipes leading to said outer valves, a purifier in said draw-off pipe, a cam shaft and cams on said shaft to open and close said valves in predetermined timed sequences.

58. Apparatus for transferring containers into and from a sealing room containing a selected sealing gas which comprises inlet and outlet chambers open alternately to atmosphere and to communication with said room, means to withdraw air from and supply selected sealing gas to said chambers between closure to atmosphere and communication with said room, means to withdraw said selected gas and admit air to said chambers after closing communication to said room, said air and gas withdrawal and supply means each comprising two pairs of valves, one for each chamber, a pipe from each respective chamber leading to position between the valves and its respective pair, a draw-off pipe connected to one valve of each of said pair of inlet means to the other valves of each of said pair.

59. Apparatus for transferring containers into and from a sealing room containing a selected sealing gas which comprises inlet and outlet chambers open alternately to atmosphere and to communication with said room, means to withdraw air from and supply selected sealing gas to said chambers between closure to atmosphere and communication with said room, means to withdraw said selected gas and admit air to said chambers after closing communication to said room, said air and gas withdrawal and supply means each comprising two pairs of valves, one for each chamber, the valves and its respective pair, a draw-off pipe connected to one valve of each of said pair of inlet means to the other valves of each of said pair, a cam shaft and cams on said cam shaft for controlling the opening and closing of all of said valves in predetermined timed sequence.

60. Apparatus for transferring containers into and from a sealing room containing a selected sealing gas which comprises inlet and outlet chambers open alternately to atmosphere and to communication with said room, means to withdraw air from and supply selected sealing gas to said chambers between closure to atmosphere and communication with said room, means to withdraw said selected gas and admit air to said chambers after closing communication to said room, said air and gas withdrawal and supply means each comprising two pairs of valves, one for each chamber, a pipe from each respective chamber leading to position between the valves and its respective pair, a draw-off pipe connected to one valve of each of said pair of inlet means to the other valves of each of said pair, a cam shaft and cams on said cam shaft for controlling the opening and closing of all of said valves in predetermined timed sequence, pneumatic means for opening and closing said chambers to atmosphere and to communication with said room and control means for controlling said pneumatic opening and closing means in synchronism with said cam shaft.

61. Apparatus for transferring containers to a sealing room which comprises a transfer chamber, closures for said chamber, one opening to atmosphere and the other to said room, means to withdraw air from said chamber, said means comprising a control valve, an electric circuit having parallel branch circuits one for each of said closures, each of said circuits having a switch closed when its respective closure is open, a switch in series with said branch circuits and closed when said control valve is open and an electromagnetic switch in said circuit to close said air withdrawal means when energized.

62. Apparatus for transferring containers to a sealing room which comprises a transfer chamber, closures for said chamber, one opening to atmosphere and the other to said room, means to withdraw air from said chamber, said means comprising a control valve, an electric circuit having parallel branch circuits one for each of said closures, each of said circuits having a switch closed when its respective closure is open, a switch in series with said branch circuits and closed when said control valve is open and an electromagnetic switch in said circuit to close said air withdrawal means when energized, a cam shaft and cams on said cam shaft for controlling the opening and closing of all of said valves in predetermined timed sequence, pneumatic means for opening and closing said closures to atmosphere and to communication with said room and control means for controlling said pneumatic opening and closing means in synchronism with said cam shaft and an air inlet having a switch opening and closing therewith in parallel with said control valve switch and in series with said parallel circuits.

63. Apparatus for transmitting containers to a sealing room which comprises a transfer chamber, closures for said chamber, one opening to atmosphere and the other to said room, means to withdraw air from said chamber, said means comprising a control valve, an electric circuit having parallel branch circuits one for each of said closures, each of said circuits having a switch closed when its respective closure is open, a switch in series with said branch circuits and closed when said control valve is open and an electromagnetic switch in said circuit to close said air withdrawal means when energized, a cam shaft and cams on said cam shaft for controlling the opening and closing of all of said valves in predetermined timed sequence, pneumatic means for opening and closing said closures to atmosphere and to communication with said room and control means for controlling said pneumatic opening and closing means in synchronism with said cam shaft, a gas supply and withdrawal means having a control valve for the withdrawal of gas, a switch closed when said valve is open and in parallel with the air control valve switch and in series with said parallel branch circuits and an electro-magnetic valve in said circuit to close said chamber from said gas supply and withdrawal means when energized.

64. Apparatus for transferring containers to a sealing room which comprises a transfer chamber, closures for said chamber, one opening to atmosphere and the other to said room, means to withdraw air from said chamber, said means comprising a control valve, an electric circuit having parallel branch circuits one for each of said closures, each of said circuits having a switch closed when its respective closure is open, and a switch in series with said branch circuits and closed when said control valve is open and an electromagnetic switch in said circuit to close said air withdrawal means when energized and means controlled by the energizing of said circuit to stop the operation of said apparatus.

65. Apparatus for transferring containers to and from a sealing room which comprises transfer chambers through one of which containers may be passed to said room and through the other of which containers may be removed from said room each of said chambers having a closure to the atmosphere and to communication with said room pneumatically operated means for opening and closing the closures of the respective chambers in alternatively timed sequence, means for withdrawing air from each said chamber and supplying a selected gas thereto between closing of said closure to the atmosphere and opening to communication with said room, means for withdrawing and recovering said selected gas and admitting air to each respective chamber between closing said chamber to said room and opening it to atmosphere, control means one for each said chamber to open and close said closures of the respective chamber in timed sequence, valves for controlling the admission and withdrawal of air and gas to and from said chambers and a common driving means for all of said control means whereby they are operated in fixed synchronism one with the other.

66. Apparatus for transferring containers to a sealing room which comprises a transfer chamber, closures for said chamber, one opening to atmosphere and the other to said room, means to withdraw air from said chamber, said means comprising a control valve, an electric circuit having parallel branch circuits one for each of said closures, each of said circuits having a switch closed when its respective closure is open, and a switch in series with said branch circuits and closed when said control valve is open and an electromagnetic switch in said circuit to close said air withdrawal means when energized and means controlled by the energizing of said circuit to stop the operation of said apparatus and manual means to open said closures.

67. Apparatus for transferring containers to a sealing room which comprises a transfer chamber, closures for said chamber, one opening to atmosphere and the other to said room, means to withdraw air from said chamber, said means comprising a control valve, an electric circuit having parallel branch circuits one for each of said closures, each of said circuits having a switch closed when its respective closure is open, and a switch in series with said branch circuits and closed when said control valve is open and an electromagnetic valve in said circuit to close said air withdrawal means when energized and electric means controlled by the energizing of said circuit to stop the operation of said apparatus and to close said air withdrawal means to said chamber whenever a closure of said chamber is open simultaneously with an opening of said chamber to said withdrawal means.

68. Apparatus for transferring containers to a sealing room which comprises a transfer chamber, closures for said chamber, one opening to atmosphere and the other to said room, means to withdraw air from said chamber, said means comprising a control valve, an electric circuit having parallel branch circuits one for each of said closures, each of said circuits having a switch closed when its respective closure is open, and a switch in series with said branch circuits and closed when said control valve is open and an electromagnetic switch in said circuit to close said air withdrawal means when energized and means controlled by the energizing of said circuit to stop the operation of said apparatus, manual means to open said closures, said electric means comprising a pair of parallel branch circuits one for each closure and having switches closed when its respective closure is open and a pair of branch circuits in series with the branch circuits of said closures and having switches that are closed when the respective valves are opened and electromagnetic valves to close communication between said chamber and the air withdrawal means.

69. Apparatus for moving containers into a room under a selected atmosphere which comprises a conveyor to convey said containers in single file, means to align a group of said containers, an inlet chamber, means to move said group of containers sidewise of its direction of alignment into said chamber, means to close said chamber, means to withdraw air from said chamber, means to admit selected atmosphere to said chamber, means to open said chamber to said room and means to move said containers from said chamber sidewise of the direction of alignment into said room.

70. Apparatus for moving containers into a room under a selected atmosphere which comprises a conveyor to convey said containers in single file, means to align a group of said containers, an inlet chamber, means to move said group of containers sidewise of its direction of alignment into said chamber, means to close said chamber, means to withdraw air from said chamber, means to admit selected atmosphere to said chamber, means to open said chamber to said room and means to move said containers from said chamber sidewise of the direction of alignment into said room and means to withdraw and retrieve the gas of said selected atmosphere from said chamber, after the removal of said containers therefrom.

71. Apparatus for transferring containers to and from a room having a gaseous content other than atmospheric which comprises an inlet chamber and an outlet chamber, means for opening said chambers alternatively to atmosphere and to said room and for transferring containers between said chamber and the atmosphere and between said chamber and said room during said periods of opening, means for exhausting air from and admitting a selected gas to said inlet chamber between periods of opening and means for retrieving said gas from said outlet chamber and admitting air thereto between the periods of opening of the latter.

72. Apparatus for transferring containers to and from a room having a gaseous content other than atmospheric which comprises an inlet chamber and an outlet chamber, means for opening said chambers alternatively to atmosphere and to said room and for transferring containers between said chamber and the atmosphere and between said chamber and said room during said periods of opening, means for exhausting air from and admitting a selected gas to said inlet chamber between periods of opening and means for retrieving said gas from said outlet chamber and admitting air thereto between the periods of opening of the latter, and independent means for said inlet chamber and outlet chamber for timing the opening and closing of said chambers and the withdrawal and admission of gases and a common driving means for said control means.

73. A method of treating material which comprises withdrawing air therefrom at an uninterrupted rate from atmospheric pressure to a predetermined sub-atmospheric pressure, then admitting selected gas to said material at a substantially uninterrupted rate, transferring said material to a sealing room filled with said selected gas and sealing said material in said sealing room in a container in said selected gas.

74. Apparatus for sealing filled containers under selected atmospheric conditions which comprises a sealing room, a chamber, means to open said chamber alternatively to the atmosphere and to said room, said means comprising a gate between said chamber and said room and a surface against which said gate seals and against which it is pressed by a difference in gaseous pressure, means to equalize the pressure between said chamber and said room and means to open said gate when said pressures are equalized.

WILLIAM MILES RYAN.
JOHN W. BOLD.